(12) United States Patent
Bhatnagar

(10) Patent No.: US 6,739,145 B2
(45) Date of Patent: May 25, 2004

(54) CONFIGURABLE ELECTRONIC CONTROLLER

(75) Inventor: Rajiv Bhatnagar, Mumbai (IN)

(73) Assignee: Vasu Tech Limited, New Delhi (IN)

( * ) Notice: Subject to any disclaimer, the term of this patent is extended or adjusted under 35 U.S.C. 154(b) by 0 days.

(21) Appl. No.: 09/746,651

(22) Filed: Dec. 21, 2000

(65) Prior Publication Data

US 2001/0039190 A1 Nov. 8, 2001

(30) Foreign Application Priority Data

May 4, 2000 (IN) .................................. 409/MUM/2000

(51) Int. Cl.[7] .............................................. F25B 49/02
(52) U.S. Cl. ............................. 62/127; 62/153; 62/298; 68/12.02
(58) Field of Search .......................... 62/125, 126, 127, 62/129, 130, 298, 151, 153, 152, 155, 156; 68/12.01, 12.02

(56) References Cited

U.S. PATENT DOCUMENTS

| | | | |
|---|---|---|---|
| 4,158,759 A | 6/1979 | Mason | |
| 4,367,387 A | 1/1983 | Tachihara et al. | |
| 4,399,352 A | 8/1983 | Ueda | |
| 4,406,945 A | 9/1983 | Ueda et al. | |
| 4,431,893 A | 2/1984 | Levie | |
| 4,481,393 A | 11/1984 | Ueda | |
| 4,504,716 A | 3/1985 | Sakamoto | |
| 4,533,810 A | 8/1985 | Harmon et al. | |
| 4,545,210 A | * 10/1985 | Lord | 62/127 X |
| 5,276,630 A | * 1/1994 | Baldwin et al. | 62/126 X |
| 5,306,995 A | 4/1994 | Payne et al. | |
| 5,412,291 A | 5/1995 | Payne et al. | |
| 5,619,614 A | 4/1997 | Payne et al. | |
| 5,647,231 A | 7/1997 | Payne et al. | |
| 5,950,709 A | * 9/1999 | Krueger et al. | 62/298 X |
| 6,330,806 B1 | * 12/2001 | Beaverson et al. | 62/298 X |

* cited by examiner

*Primary Examiner*—Harry B. Tanner
(74) *Attorney, Agent, or Firm*—Needle & Rosenberg, P.C.

(57) ABSTRACT

This invention provides a configurable electronic controller comprising control circuitry and output interface circuitry that is characterized such that the said control circuitry and said output interface circuitry are designed to be configurable for various control functions and various interfaces respectively, by means of configuration data supplied by a configuration memory included with the said electronic controller. The said configurable electronic controller further optionally includes configurable input interface circuitry, configurable user interface circuitry, configurable power supply interface circuitry, and network interface circuitry.

52 Claims, 16 Drawing Sheets

CONFIGURABLE ELECTRONIC CONTROLLER

This invention relates to a configurable electronic control unit designed to perform control functions in a wide variety of applications. The applications range from the control of appliances to implementation of control functions in commercial, industrial and automotive environments. Some examples of applications are refrigerators and washing machines in the field of appliances, HVAC (Heating, Ventilation and Air-Conditioning) and security controls in residential and commercial environments, and passenger compartment climate control in the automotive area. The controller is configurable in a variety of ways to provide flexibility and optimisation of control in the intended application, at low cost.

BACKGROUND

Control systems are used to regulate the operation of a device or system in a desired manner. This activity, in most cases, involves the control of one or more physical parameters such as temperature, pressure, level, flow, position, speed, and the like. To perform such a function it is generally necessary for the control system to sense and measure the value of the physical parameters, compare the measured values with the requirement and then operate one or more actuation devices (e.g. motors, valves, heaters) to automatically adjust the values of these parameters to desired levels. Depending upon the physical parameters involved, various transducers/sensors are used to convert the value of the physical parameter to a signal suitable for processing by the control system. In electrical/electronic control systems the conversion is to a suitable electrical parameter e.g. voltage, current, resistance, while in electro-pneumatic or mechanical systems the conversion is generally to a suitable mechanical property e.g. presssure, displacement. The selection of a transducer/sensor for a specific application depends upon the physical parameter that is required to be measured as well as the type of signal to which the conversion is to be made.

Electronic controls provide inherent advantages over other types of controls, in the vast majority of applications. For this reason, electronic controls are replacing electromechanical and electropneumatic controls in an increasing number of applications. We shall therefore limit our analysis to electronic controllers and all subsequent references to controllers and control systems shall pertain to electronic controllers and control systems.

The various types of transducers/sensors have different interface requirements and produces output signals with different characteristics. The control system has to provide the necessary interface conditions required by each transducer and possess the ability to process the signals received from it. This makes it necessary for the control system to provide different interface signals for each type of transducer/sensor.

In like manner, the various output devices that are required to be actuated by the control system inorder to bring about the correction or "control" of the sensed physical parameter, differ in their requirements for actuation DC motors and AC motors for example, have different drive requirements. In some applications using AC loads simple ON-OFF control of the load is required, while in other applications phase-angle control or integral-cycle control or integral half-cycle control may be necessary. Similarly, in controlling DC loads a simple ON-OFF control may be adequate while in other applications pulse-width-modulation output is necessary. Likewise, different types of power switching have differing requirements for operation. Triac-firing requirements are very different from the requirements for switching relays or contactors. For each case the electronic circuitry in the controller has to change inorder to provide compatibility.

User interfaces also exist in a wide variety of forms, each requiring differing interfaces to the electronic control system. Analog devices such as potentiometers, for example, interface differently from digital devices such as keyboards. Similarly, remote control devices require a special interface which varies depending on the type of remote control used-viz. radio-frequency, infrared, ultrasonic. Also display devices come in many varieties—e.g. LED, LCD, vacuum-fluorescent—each type requiring different interface signals.

Several electronic control systems in use today are based on microprocessors/microcontrollers that use software/firmware for defining the operation of the system. However, the various options described in the preceeding paragraphs, are not implementable through changes in software. Therefore in present designs the desired options are achieved by modifying the design and providing circuitry for each case. This implies that a control system designed and made for one type of sensor/transducer will not work with another transducer/sensor without making significant changes to the hardware. The electronic circuitry requirements are different for each of the interfaces. What is therefore required is that the circuitry is tailored for each interface. This requirement is achieved in one of 2 forms in existing designs. The less expensive designs are "hardwired" for a particular set of interfaces. A different "hardwired" version is used for each combination of interfaces. This results in a number of "models" or variants that differ only in the interface specifications. More expensive controllers, on the other hand, are designed in a modular fashion, with the input and output interfaces designed as separate modules. There are a number of different types of modules available, one for each of the various interface options. The controller can be configured for various interface options by installing interface modules as required. This configuration may also be changed as required. However, the modular construction still requires physical change of modules for converting from one interface option to another. This implementation generally comes at a significant cost, and is hence applied only to relatively expensive products.

An additional constraint of existing electronic controls which are typically designed around microprocessors/microcontrollers which are programmed to perform the desired control actions is that the microprocessors/microcontrollers are very limited in terms of interfaces. This limitation stems from the fact the architecture of these devices is compute-oriented rather than control-oriented. The actual environment of a control application typically involves the processing of a significant number of signals and devices (e.g. sensors, switches, motors, etc.) some of which are analog in nature. Consequently, a significant amount of circuitry is required in addition to the microcontroller—such as latches, decoders, drivers, multiplexers, analog-to-digital converters, digital-to-analog converters, signal-conditioning circuitry, etc. Some more expensive microcontrollers are available today that incorporate some additional circuitry such as analog-to-digital converters. PWM circuits, etc. However, these devices also require substantial additional circuitry in the majority of applications as the internal circuitry is still quite limited and involves compromises with the implementation of other functions. As a result, the application does not realise the full benefits of an electronic solution. U.S. Pat. Nos. 4,158,759, 4,367,387, 4,399,352, 4,406,945, 4,431,893, 4,481,393, 4,504,716, 4,533,810, 4,367,387, and 4,504,716 are examples of such electronic controls for applications in various appliances.

Some reconfigurable electronic controllers are also known. U.S. Pat. Nos. 5,306,995, 5,412,291, 5,619,614, and 5,647,231 describe some reconfigurable electronic controllers. However, the inventions covered by these patents are limited to only washing machines and dryers, and are at the same time relatively expensive to implement as they make use of fairly computation-intensive algorithms utilising fuzzy-logic implementations on microprocessor-based hardware. The limitations cited above in the case of microprocessor-based implementations are also applicable to these inventions.

Some general-purpose reconfigurable hardware devices are also known. Generically known as Field programmable Gate Arrays (FPGAs), these devices provide configurable hardware at the gate-level. These devices can be used to construct a wide variety of hardware with different functionality. Some mixed-signal (analog and digital) programmable array devices are also now available. However, these devices are limited in the variety and number of analog functions that are available. Furthermore, both the FPGA and mixed-signal array devices are difficult to configure and use because the circuit elements provided in them are very basic elements that require a large number of interconnections between them to provide the desired functionality. Quite often it is not possible to achieve the desired interconnections in a device containing a sufficient number of circuit elements and a larger and more expensive device has to be used. These limitations arise because the programmable array devices are designed as extremely general purpose devices, and are not oriented towards any specific area of application.

What is therefore required is a device that is designed for the specific requirements of control applications, including the requirements of interfacing to input and output devices in a variety of different ways, using an appropriate set of circuit elements in an arrangement that is configurable for any of the desired functions.

THE OBJECT AND SUMMARY OF THE INVENTION

The object of this invention is to provide a control element which is designed to to be configurable for a wide variety of control functions including the configuring of both analog and digital input, output, user and power supply interfaces, as required, with minimal physical changes, and at low cost.

To achieve the said objective this invention provides an electronic controller comprising control circuitry for providing control functions, and output interface circuitry for providing output signals for controlling one or more load devices, characterized such that the said control circuitry and the said output interface circuitry are designed to be configurable for various control functions and various interfaces respectively, by means of configuration data supplied by a configuration memory included with the said electronic controller.

The said electronic controller includes input interface circuitry connecting to one or more analog or digital input devices or switches for receiving input signals, being characterised such that the said input interface circuitry is designed to be configurable, by means of configuration data supplied by the said configuration memory.

The said electronic controller further includes user interface circuitry connecting to one or more analog or digital input devices or switches for receiving user inputs and one or more display or audio devices for providing feedback to the user, being characterised such that the said user interface circuitry is designed to be configurable, by means of configuration data supplied by the said configuration memory.

The said electronic controller further includes power supply interface circuitry which connects to a power supply, monitors the power source conditions and provides control signals, being characterised such that the said power supply interface circuitry is designed to be configurable, by means of configuration data supplied by the said configuration memory.

The said electronic controller further includes network interface circuitry for interfacing to a network that provides unidirectional or bi-directional data exchange with other devices on the network.

The said configurable control circuitry and configurable output interface circuitry, are made configurable by providing, in each circuitry:

a plurality of predetermined circuit elements containing a plurality of known circuit element types each of which provides a specific function, the number and types of said circuit elements being chosen such that the functional requirements of each of the desired configurations are met, a means for interconnecting the said circuit elements in required defined ways, each of which implements a desired set of functions by means of configuration data supplied by the said configuration memory.

The said configurable input interface circuitry, is made configurable by providing:

a plurality of predetermined circuit elements containing a plurality of known circuit element types each of which provides a specific function, the number and types of said circuit elements being chosen such that the functional requirements of each of the desired configurations are met, a means for interconnecting the said circuit elements in required defined ways, each of which implements a desired set of functions by means of configuration data supplied by the said configuration memory.

The said configurable user interface circuitry, is made configurable by providing:

a plurality of predetermined circuit elements containing a plurality of known circuit element types each of which provides a specific function, the number and types of said circuit elements being chosen such that the functional requirements of each of the desired configurations are met, a means for interconnecting the said circuit elements in required defined ways, each of which implements a desired set of functions by means of configuration data supplied by the said configuration memory.

The said configurable power supply interface circuitry, is made configurable by providing:

a plurality of predetermined circuit elements containing a plurality of known circuit element types each of which provides a specific function, the number and types of said circuit elements being chosen such that the functional requirements of each of the desired configurations are met, a means for interconnecting the said circuit elements in required defined ways, each of which implements a desired set of functions by means of configuration data supplied by the said configuration memory.

The said control circuitry in another implementation is a Gate Array that is configured for desired functionality by the configuration data supplied by the said configuration memory.

The said control circuitry in another implementation is an embedded microcontroller with associated program memory containing a set of control programs the appropriate subset of programs being selected for desired functionality by the configuration data supplied by the said configuration memory.

The said control circuitry in another implementation is an embedded digital signal processor (DSP) with associated program memory containing a set of control programs the appropriate subset of programs being selected for desired functionality by the configuration data supplied by the said configuration memory.

The said control circuitry includes functionality for providing simple ON-OFF control action.

The said control circuitry includes functionality for providing Proportional, Integral, Derivative (PID) control action.

The said control circuitry includes a Real-Time-Clock (RTC) inorder to provide the control functions based on real-time events.

The said output interface circuitry is configurable for each of the outputs to provide a level or a pulsed output signal for controlling the load, by means of configuration data supplied by the said configuration memory.

The said output interface circuitry is configurable for each of the outputs to provide a triac-drive signal or a relay/contactor drive signal or a MOSFET/IGBT drive signal or a transistor drive signal for controlling the load, by means of configuration data supplied by the said configuration memory.

The said output interface circuitry is configurable for each of the outputs to provide a phase-angle control signal or integral cycle control signal or integral half-cycle control signal for controlling the load, by means of configuration data supplied by the said configuration memory.

The said input interface circuitry is configurable for each of the inputs to provide either a desired value of a constant current bias, or a balanced bridge interface, or an AC bias supply to the external signal source, by means of configuration data supplied by the said configuration memory.

The said input interface circuitry is configurable for each of the inputs to either perform analog-to-digital conversion for the case when the input signal is analog in nature, or process the signal without analog-to-digital conversion when the input signal is digital in nature, by means of configuration data supplied by the said configuration memory.

The said input interface circuitry is configurable for each of the inputs to perform debouncing for the case when the input signal is received from a mechanical switch, by means of configuration data supplied by the said configuration memory.

The said input interface circuitry is configurable for each of the inputs to include a filter in the processing of the received signal if so required, by means of configuration data supplied by the said configuration memory.

The said input interface circuitry is configurable for each of the inputs to include an averaging circuit in the processing of the input signal if so desired, by means of configuration data supplied by the said configuration memory.

The said user interface circuitry is configurable for each input to provide desired constant current bias if required by the external user input device, by means of configuration data supplied by the said configuration memory.

The said user interface circuitry is configurable for receiving user input though an infrared/ultrasonic/radio-frequency remote entry device, by means of configuration data supplied by the said configuration memory.

The said user interface circuitry is configurable for providing output signals for driving either an LED display, or a vacuum fluorescent display or an LCD display, by means of configuration data supplied by the said configuration memory.

The said user interface circuitry is configurable for providing output signals for driving either an multi-digit 7-segment display, or a bar-graph display, by means of configuration data supplied by the said configuration memory.

The said user interface circuitry includes the provision for generating tones and driving an audio transducer.

The said user interface circuitry includes the provision for generating synthesized voice output signals and driving an audio transducer.

The said power supply interface circuitry is configurable for monitoring the input a.c. supply voltage and providing a signal if the said a.c. supply voltage is less than or greater than defined limits, by means of configuration data supplied by the said configuration memory.

The said power supply interface circuitry is configurable for monitoring the input d.c. supply voltage and providing a signal if the said d.c. supply voltage is less than or greater than defined limits, by means of configuration data supplied by the said configuration memory.

The said power supply interface circuitry is configurable for monitoring the input a.c. supply voltage and providing a signal on every zero-voltage crossing of the input a.c. supply, by means of configuration data supplied by the said configuration memory.

The said network interface circuitry provides an interface to a TCP/IP network.

The said network interface circuitry provides an interface to a CAN Bus network.

The said network interface circuitry provides an interface to a BACNet network.

The said network interface circuitry provides an interface to a BlueTooth wireless network.

The said configuration memory is preferably a non-volatile memory.

The said Clock Generator is an oscillator with a frequency preferably in the range 32 KHz to 25 MHz.

In a washing machine, an electronic controller comprising configurable control circuitry, output interface circuitry, input interface circuitry, user interface circuitry, power supply interface circuitry, network interface circuitry and configuration memory, wherein the configuration data from the said configuration memory:

a) configures the configurable control circuitry which is based on an embedded microcontroller, to provide desired control functions using a selected set of stored control programs, b) configures the configurable output interface circuitry for providing triac-controlled drive for the wash motor, and water-fill, drain and detergent-dispense solenoids, c) configures the configurable input interface circuitry for providing bias drive for the water temperature sensor, and water level sensor and for enabling analog-to-digital conversion with suitable sensitivity offset and linearity correction, noise filtering and signal averaging for the analog signals received from these sensors, d) configures the configurable user interface circuitry for interfacing to a keyboard on the control for receiving user selection input, and driving a digital LCD display and audio buzzer for providing feedback to the user, e) configures the configurable power supply interface for monitoring the input a.c. supply voltage and providing a signal when the voltage is outside defined limits.

In a household refrigerator, an electronic controller comprising configurable control circuitry, output interface circuitry, input interface circuitry, user interface circuitry, power supply interface circuitry, network interface circuitry and configuration memory wherein the configuration data from the said configuration memory:

a) configures the configurable control circuitry which is based on an gate array logic, to provide temperature control functions using a selected set of stored control programs, b) configures the configurable output interface circuitry for providing triac-controlled drive for the refrigeration compressor, defrost heater, and air-circulation blowers and dampers, c) configures the configurable input interface circuitry for providing bias drive for the temperature sensors, and for enabling analog-to-digital conversion with suitable sensitivity offset and linearity correction, noise filtering and signal averaging for the analog signals received from these sensors, d) configures the configurable user interface circuitry for interfacing to a keyboard on the control panel as well as an infra-red remote control device for receiving user selection input, and driving a digital LCD display and audio buzzer for providing feedback to the user, e) configures the configurable power supply interface for monitoring the input a.c. supply voltage and providing a signal when the voltage is outside defined limits.

In an HVAC control system, an electronic controller comprising configurable control circuitry, output interface circuitry, input interface circuitry, user interface circuitry, power supply interface circuitry, network interface circuitry and configuration memory, wherein the configuration data from the said configuration memory:

a) configures the configurable control circuitry which is based on an embedded microcontroller, to provide airflow control and temperature control functions using a selected set of stored control programs, b) configures the configurable output interface circuitry for providing brushless-DC motor drive for the airflow blower, triac-controlled drive for the air-conditioning compressor motor, and integral-cycle controlled drive for the air-conditioning heaters, c) configures the configurable input interface circuitry for providing bias drive for the temperature sensor, airflow sensor and humidity sensor, and for enabling analog-to-digital conversion with suitable sensitivity offset and linearity correction, noise filtering and signal averaging for the analog signals received from these sensors, d) configures the configurable user interface circuitry for interfacing to a keyboard on the control panel as well as an infra-red remote control device for receiving user selection input and driving a digital LCD display and audio buzzer for providing feedback to the user, e) configures the configurable power supply interface for monitoring the input a.c. supply voltage and providing a signal when the voltage is outside defined limits.

The invention will now be described with reference to the accompanying drawings and examples:

Figure 1:
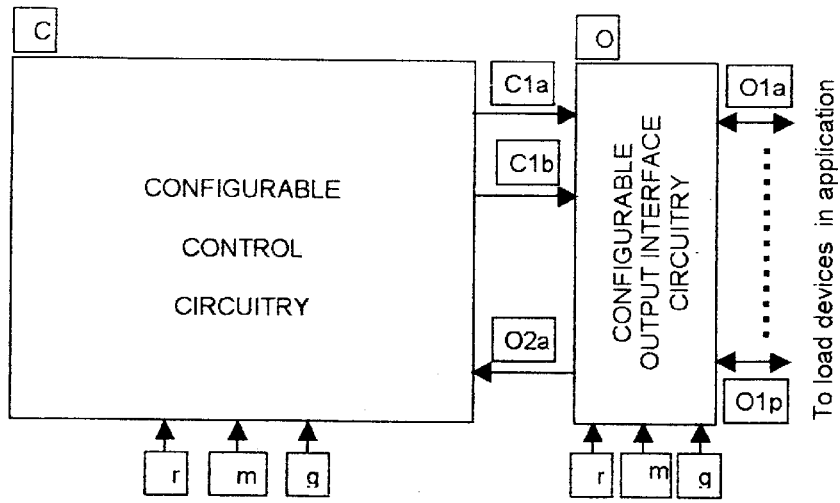
FIG. 1 shows the block diagram of the configurable electronic controller including configurable control circuitry, configurable output interface circuitry and configuration memory according to this invention.
Figure 1:
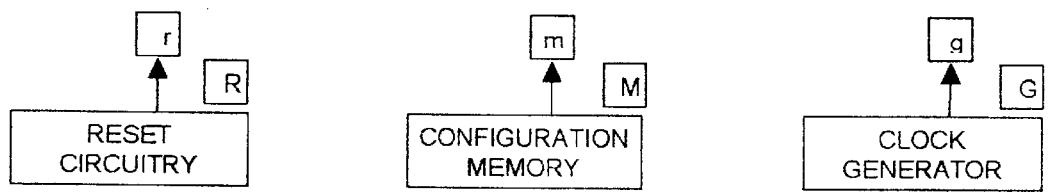

Referring to FIG. 1, control circuitry (C) is configured for desired control functions by configuration data (m) supplied by configuration memory (M). Similarly output interface circuitry (O) is configured for:

a) enabling/disabling of each output channel b) drive functionality for each of the enabled output channels c) protection functions for each enabled channel.

Figure 8:
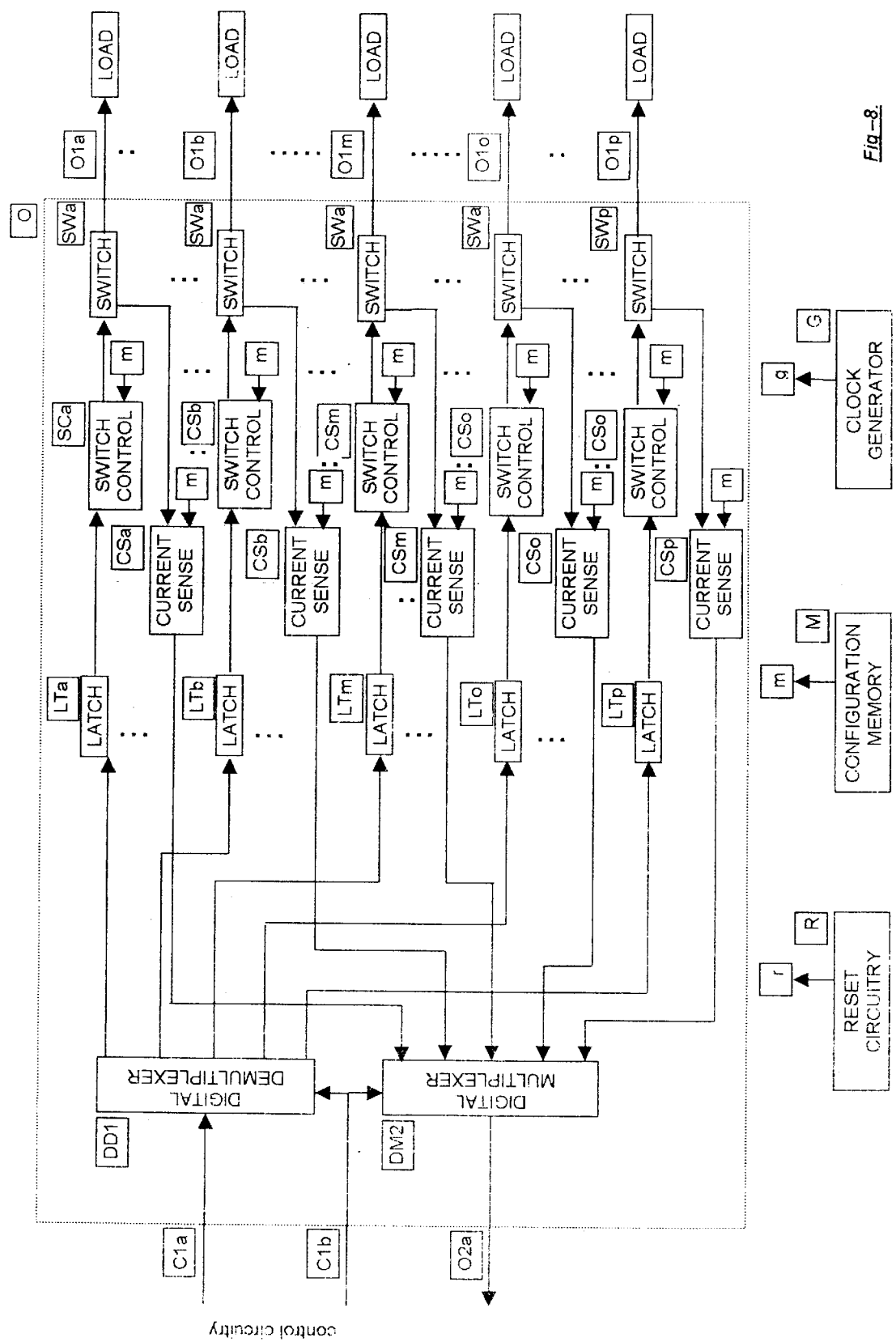
FIG. 8 shows one possible implementation of the configurable output interface circuitry.

(Details shown in FIG. 8)

During operation control circuitry (C) sequentially selects a particular channel in output interface circuitry (O) using selection control signal (C1$a$), while simultaneously providing drive signal (C1$b$) to actuate the selected output channel. Output status signal (O2$a$) provides feedback to the control circuitry on the status of the output. Reset signal (r) and clock signal (g) are supplied by reset circuit (R) and clock generator (G) for internal operations of control circuitry (C) and output interface circuitry (O).

Figure 2:
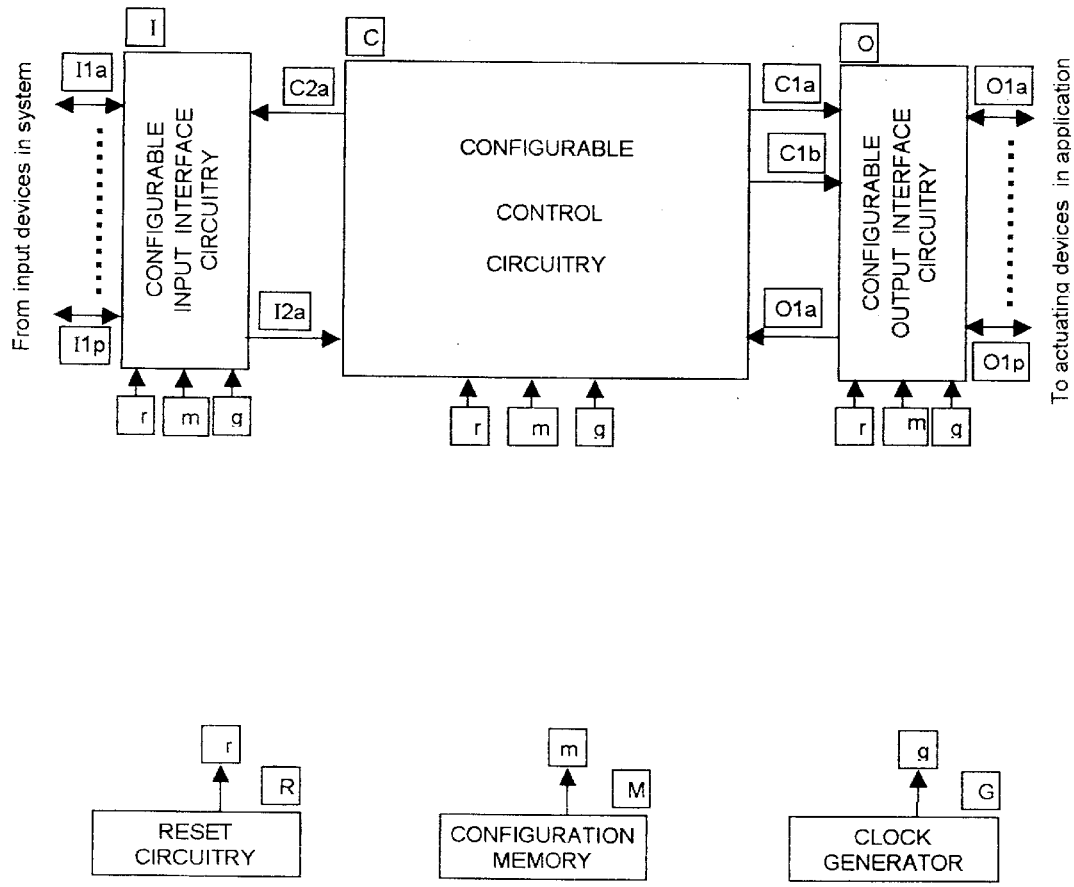
FIG. 2 shows the block diagram of the configurable electronic controller further including configurable input interface, according to this invention.

Referring to FIG. 2, in addition to the connections described in FIG. 1, signals (I1$a$) to (I1$p$) from signal sources such as transducers/sensors and switches located at various points in the application are received at the input of the input interface circuitry (I). The input interface circuitry (I) is configured by the configuration data (m) supplied by the configuration memory (M) to:

a) selectively provide the drive for one or more of these signal sources in accordance with requirements of the signal source.
b) convert signals received in analog form into digital form and correct for sensitivity, offset and linearity.
c) selectively provide noise filtration and/or signal averaging for the converted digital value.
d) selectively provide debouncing of signals received from switches.

Figure 9:
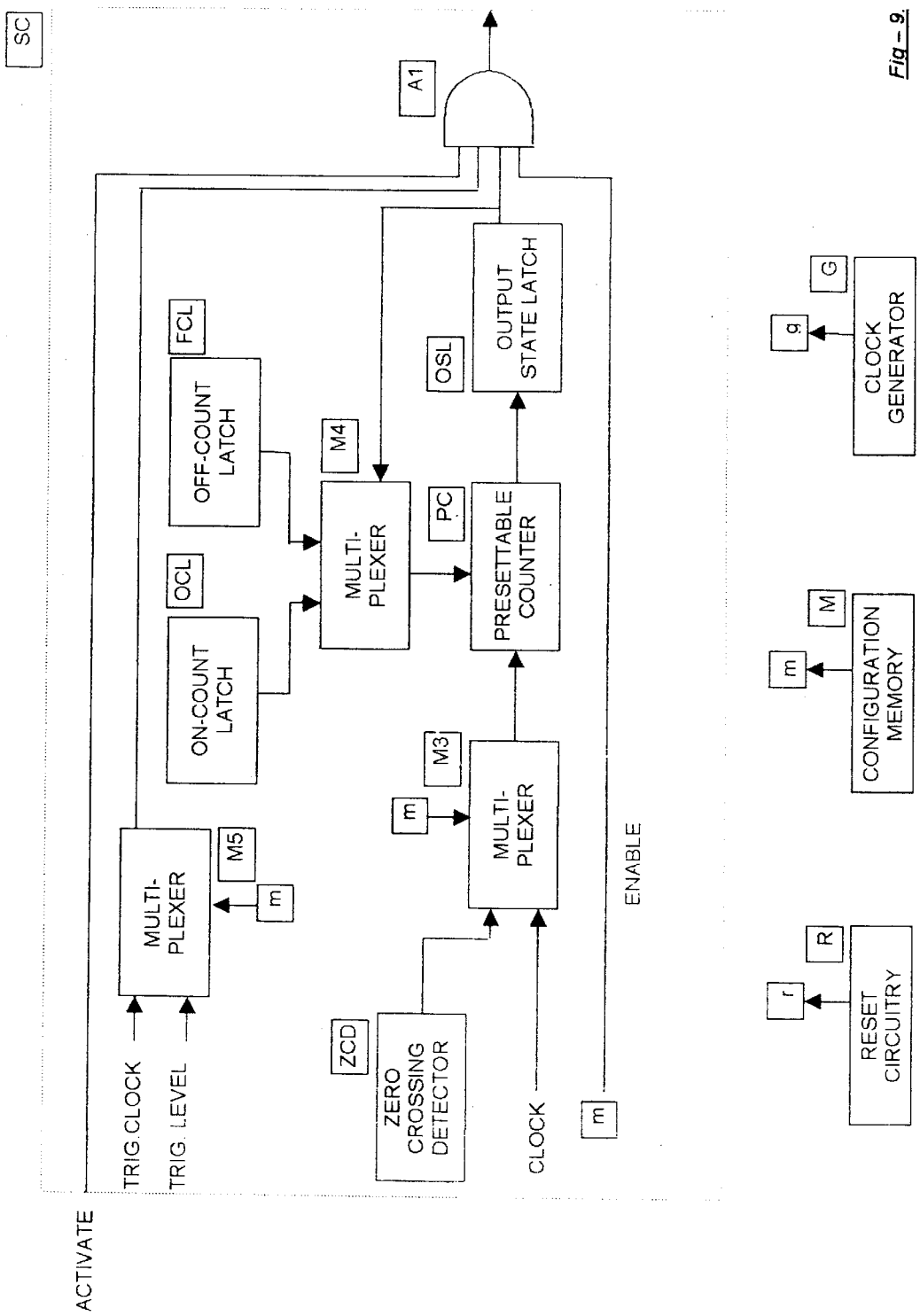
FIG. 9 shows one possible implementation of the switch control circuitry in the configurable output interface circuitry.

(Details shown in FIG. 9)

Control circuitry (C) selects one of the input channels in sequence by supplying selection control signals (C2a). Input interface circuitry (I) supplies the current value of the input signal (I2a). Reset signal (r) and clock signal (g) are supplied by reset circuit (R) and clock generator (G) for internal operations of input interface circuitry (I).

Figure 3:
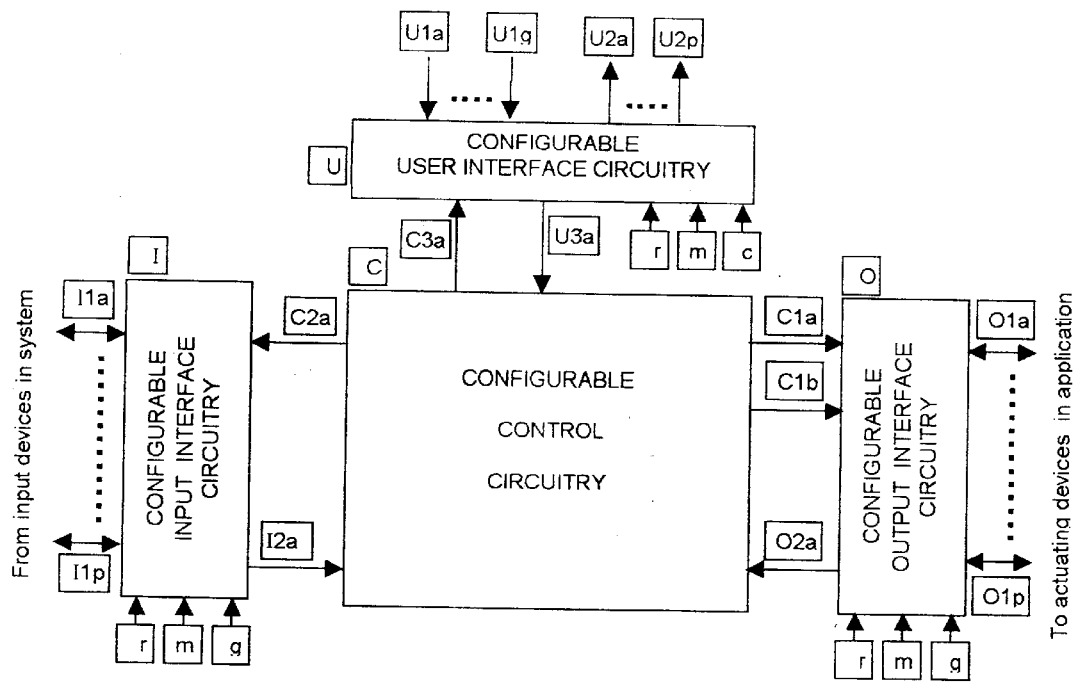
FIG. 3 shows the block diagram of the configurable electronic controller according to this invention, further including configurable user interface circuitry.
Figure 3:
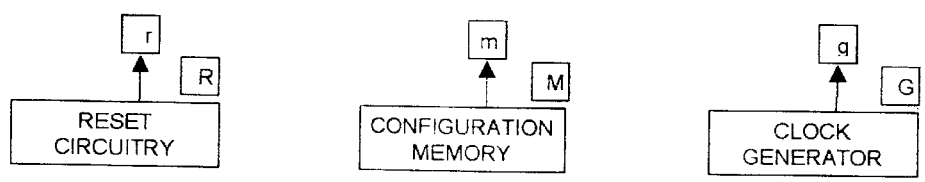

Referring to FIG. 3, in addition to the connections described against FIG. 2, signals (U1a) to (U1g) from user input devices such as potentiometers, switches, IR/radio frequency/ultrasonic remote control device or speech input device or inputs from biometric sensors such as image sensors for finger print identification, are received at the input of the user interface circuitry (U). The user interface circuitry (U) is configured by the configuration data supplied by the configuration memory (M) to:

a) selectively provide the drive for one or more of these input devices in accordance with requirements of the input device.
b) convert signals received in analog form into digital form and correct for sensitivity, offset and linearity.
c) selectively provide noise filtration and/or signal averaging for the converted digital value.
d) selectively provide debouncing of signals received from switches.
e) perform speech recognition and/or image recognition on inputs received from the speech input and image sensor devices respectively.
f) perform speech synthesis and drive the audio output device, when necessary.

Figure 10:
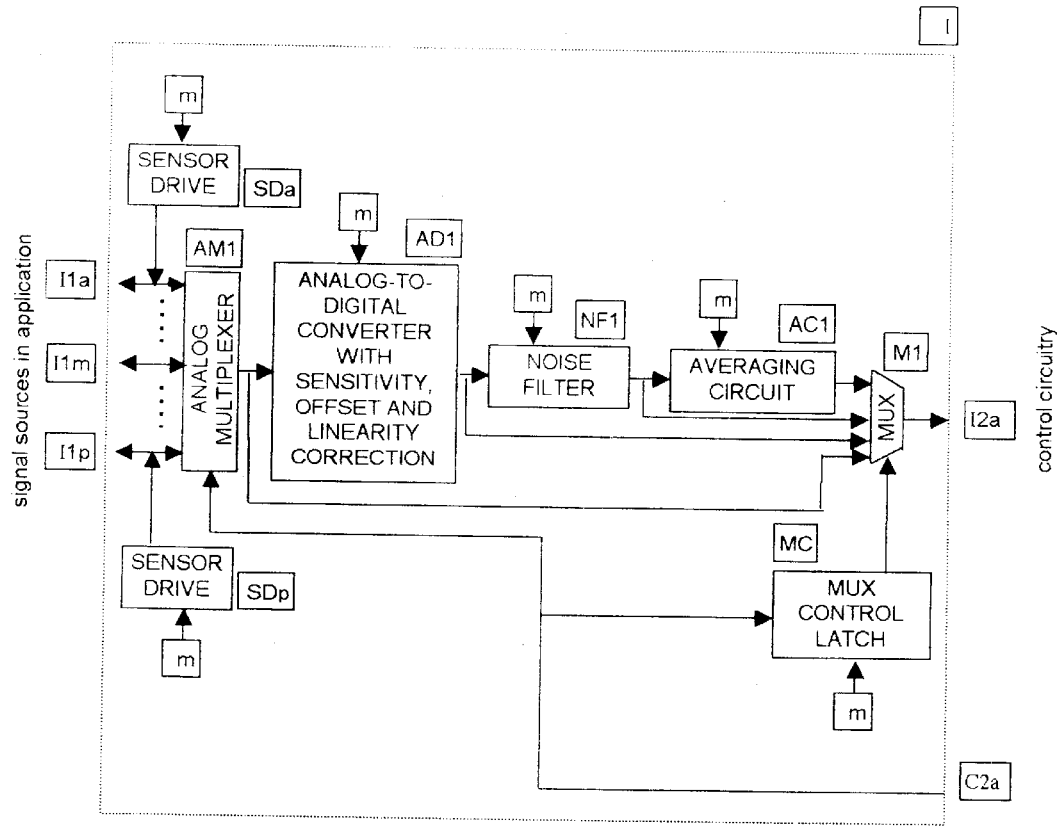
FIG. 10 shows one possible implementation of the configurable input interface circuitry.

(Details shown in FIG. 10)

Control circuitry (C) selects one of the input channels in sequence by supplying selection control signals (C3a). User interface circuitry (U) supplies the current value of the input signal (U3a). Simultaneously, control circuitry (C) supplies signal (C3a) from which user interface circuitry (U) generates output signals (U2a to U2p) for displaying information and/or providing audio output to the user. Reset signal (r) and clock signal (g) are supplied by reset circuit (R) and clock generator (G) for internal operations user interface circuitry (U).

Figure 4:
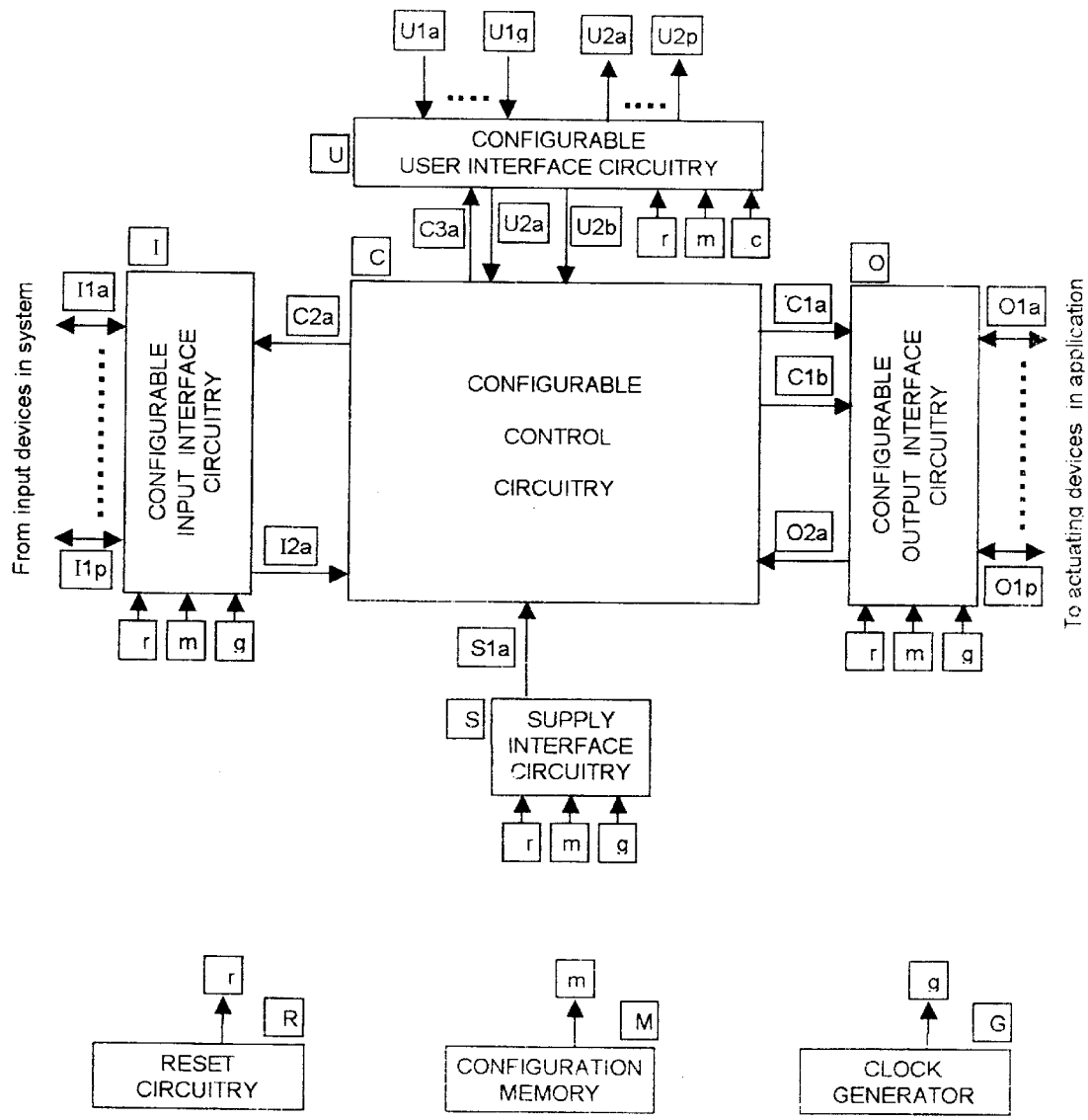
FIG. 4 shows the block diagram of the configurable electronic controller according to this invention, further including configurable power supply interface circuitry.

In FIG. 4, in addition to the connections described against FIG. 3, supply interface circuitry (S) supplies signal (S1a) to the control circuitry (C) providing information on supply conditions. Reset signal (r) and clock signal (g) are supplied by reset circuit (R) and clock generator (G) for internal operations of supply interface circuitry (S).

Figure 5:
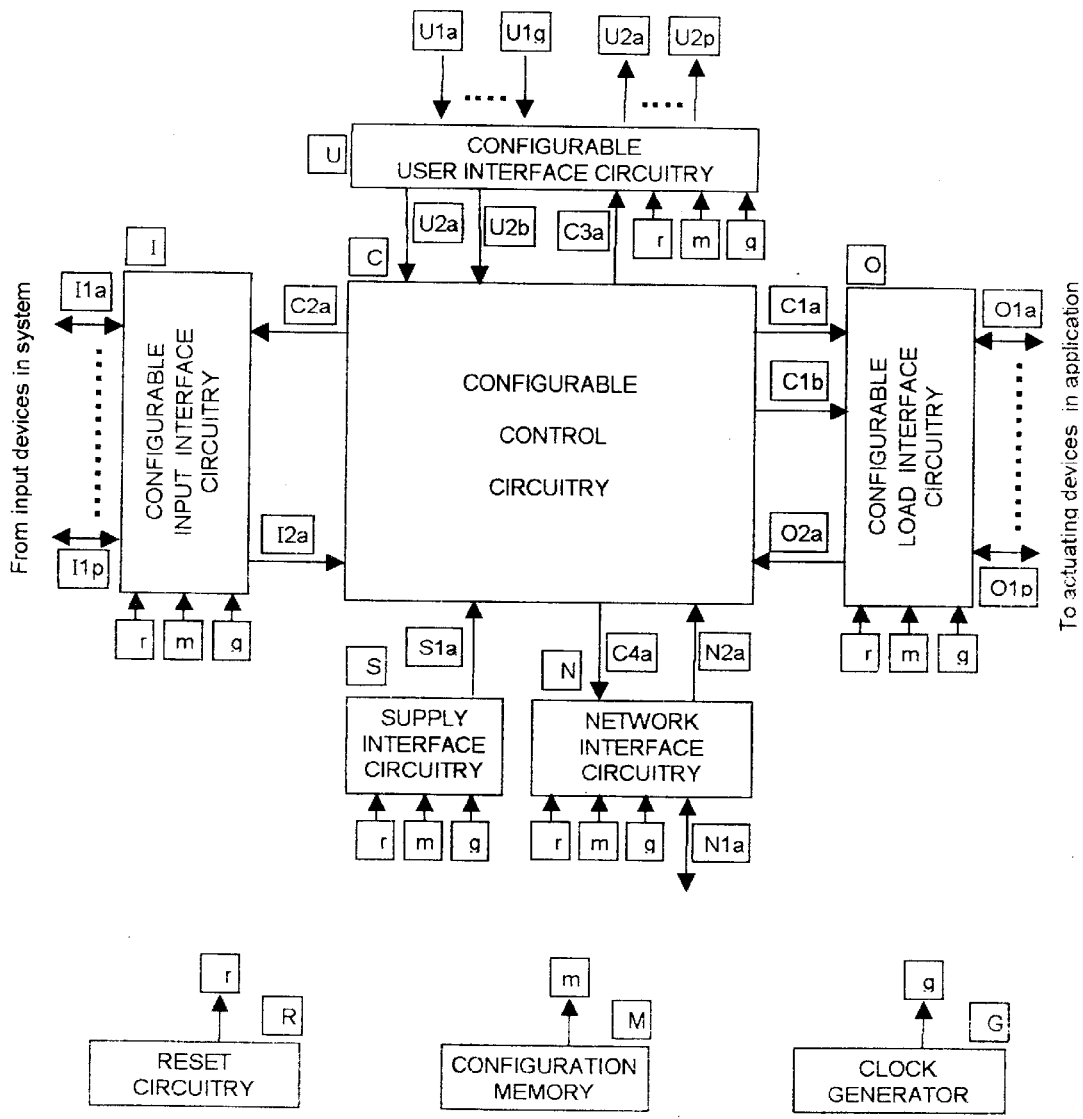
FIG. 5 shows the block diagram of the configurable electronic controller according to this invention, which further network interface circuitry.

Referring to FIG. 5, in addition to the connections described against FIG. 4, network interface circuitry (N) interfaces to control circuitry (C) supplying it with information received from external devices on the network through signal (N2a) and receives signal (C4a) containing data that is required to be transmitted to other devices on the network. Reset signal (r) and clock signal (g) are supplied by reset circuit (R) and clock generator (G) for internal operations of network interface circuitry (N).

Figure 6:
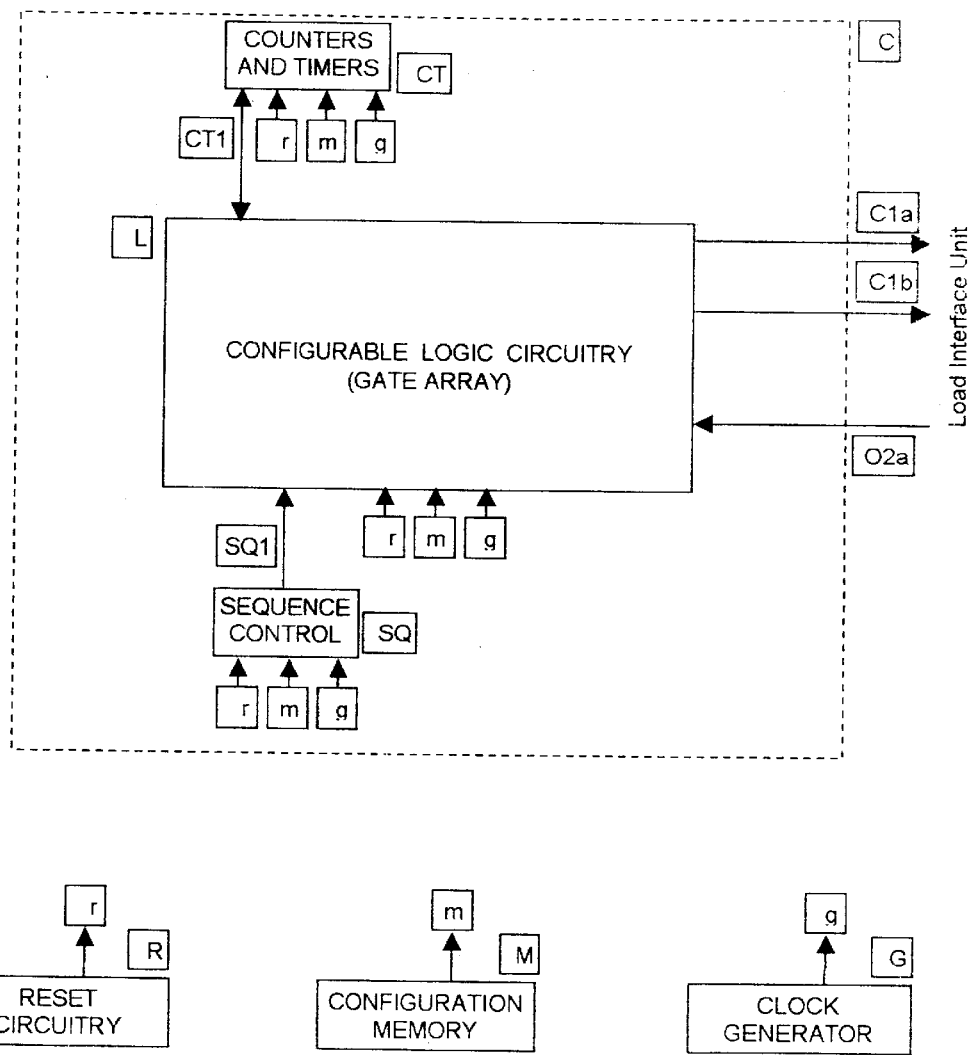
FIG. 6 shows one possible implementation of the configurable control circuitry, using a gate array, sequence control circuitry and counters and timers.

FIG. 6 shows one implementation of the control circuitry (C). Configurable logic circuitry (L), which may be a gate array circuit, is configured by the configuration data (m) supplied by configuration memory (M) to provide the desired control functions. Sequence control circuitry (SQ) and counters and timers block (CT) are similarly configured by configuration data (m) supplied by configuration memory (M) to provide support facilities for configurable control logic circuitry (L) using signals (SQ1) and (CT1) respectively. Reset signal (r) and clock signal (g) are supplied by reset circuit (R) and clock generator (G) for internal operations of configurable logic circuitry (L), sequence control circuitry (SQ) and counters and timers circuitry (CT).

Figure 7:
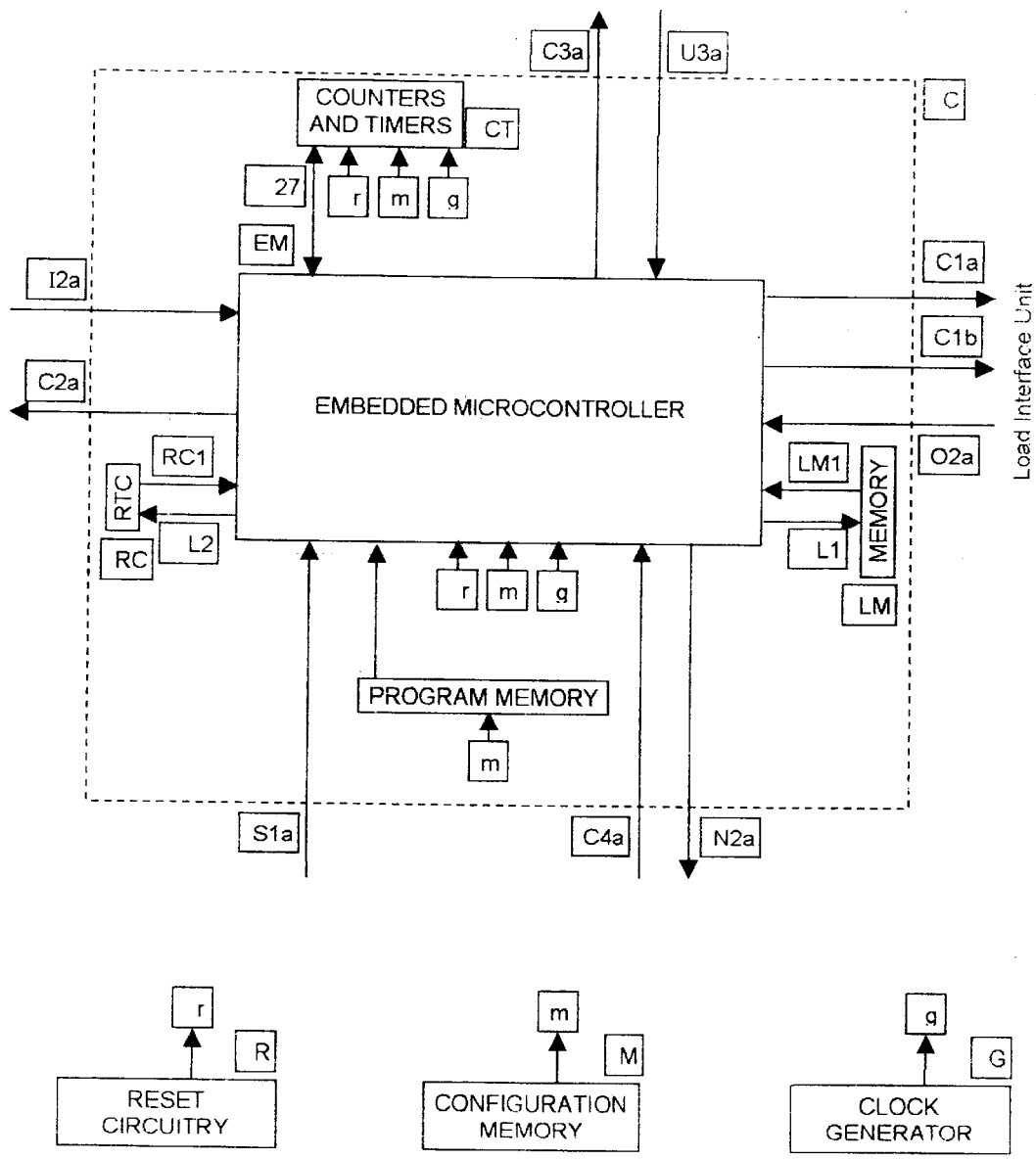
FIG. 7 shows another possible implementation of the configurable control circuitry using an embedded microcontroller with associated program memory, data memory, counters and timers, and a real-time clock.

FIG. 7 shows another implementation of the control circuitry (C) using an embedded microcontroller (EM) in place of the configurable logic circuitry. The microcontroller has associated program memory (PM) which contains a set of control programs. Configuration data (m) supplied by configuration memory (M) selects a subset of these control programs in accordance with desired functionality. The embedded microcontroller is supported by the counters and timers circuitry (CT). Memory unit (LM) and real-time clock circuitry (RTC) provide additional support facilities through signals (LM1), (L1) and (RC1), (L2) respectively. Reset signal (r) and clock signal (g) are supplied by reset circuit (R) and clock generator (G) for internal operations of the embedded microcontroller (EM), counters and timers circuitry (CT), memory unit (LM) and real-time clock circuitry (RTC).

FIG. 8 shows one implementation of the output interface circuitry. Configuration data (m) supplied by configuration memory (M) configures the functionality of switch control circuitry (SCa to SCp). Control signal (C1a) and selection signal (C1b) from control circuitry (C) selectively activate the input of each switch control (SCa to SCp) through latches (LTa to LTp) the selection being controlled through digital demultiplexer (DD1). Each switch control output provides a control signal (O1a to O1p) which drives a switch (SWa to SWp) to control the output to an external load device. Current sense circuitry (CSa to CSp) senses load current and feeds a signal back to the switch control circuitry which contains protection control logic which has been configured by the configuration data to provide the desired protection function. The switch control circuitry (SWa to SWp) also provides a feedback signal (O2a) to control circuitry (C) through digital multiplexer (DM2) on the status of the load. Reset signal (r) and clock signal (g) are supplied by reset circuit (R) and clock generator (G) for internal operations of the configurable output interface circuitry (O).

FIG. 9 shows one implementation of the switch control circuitry (SC) in the configurable output interface circuit, which is configurable to provide either phase-control drive, or integral cycle control for the output load. Configuration data (m) from the configuration memory (M) selectively routes either the zero-crossing detector (ZCD) signal, in the case of integral-cycle control or the clock signal, in the case of phase-angle control, to the output of multiplexer (M3). Accordingly, presettable counter (PC) either counts the input supply cycles, or the clock cycles. On-state count latch (OCL) and Off-state latch (FCL) provide the preset values from the configuration memory, through multiplexer (M4), to the presettable counter (PC) the output of which is stored in output state latch (OSL). Simultaneously, multiplexer (M5) selectively couples either TRIGGER CLOCK, in the case of triac-drive, or TRIGGER LEVEL, in the case of relay/contactor drive to its output under control of configuration data (m), AND gate (A1) combines the signals from multiplexer (M5), and output state latch (OSL) with the ACTIVATE input from the configurable control circuitry (C)

and the ENABLE signal from the configuration memory to provide the final output from the switch control (SC).

FIG. 10 shows one implementation of the input interface circuitry. Configuration data (m) supplied by configuration memory (M) configures the functionality of:

a) sensor drive circuits (SDa to SDp).
b) analog-to-digital converter with sensitivity, offset and linearity correction (AD1).
c) noise filter (NF1)
d) averaging circuit (AC1)

As desired. External signal sources receive drive signals (I1a to I1p) from sensor drive circuits (SDa to SDp) and supply signals to the inputs of analog multiplexer (AM1). Selection signal (C2a) from the configurable control circuitry (C) controls multiplexer control (MC) to select the appropriate multiplexer control signal from the configuration memory to control multiplexer (M1) which connects one out of following signals to the output as signal (I2a) to the configurable control circuitry (C):

a) output of the analog-to-digital converter with in-built sensitivity, offset and linearity correction,
b) output of the noise filter,
c) output of the averaging circuit,
d) output of the input analog multiplexer.

Reset signal (r) and clock signal (g) are supplied by reset circuit (R) and clock generator (G) for internal operations of the configurable input interface circuitry (I).

Figure 11:
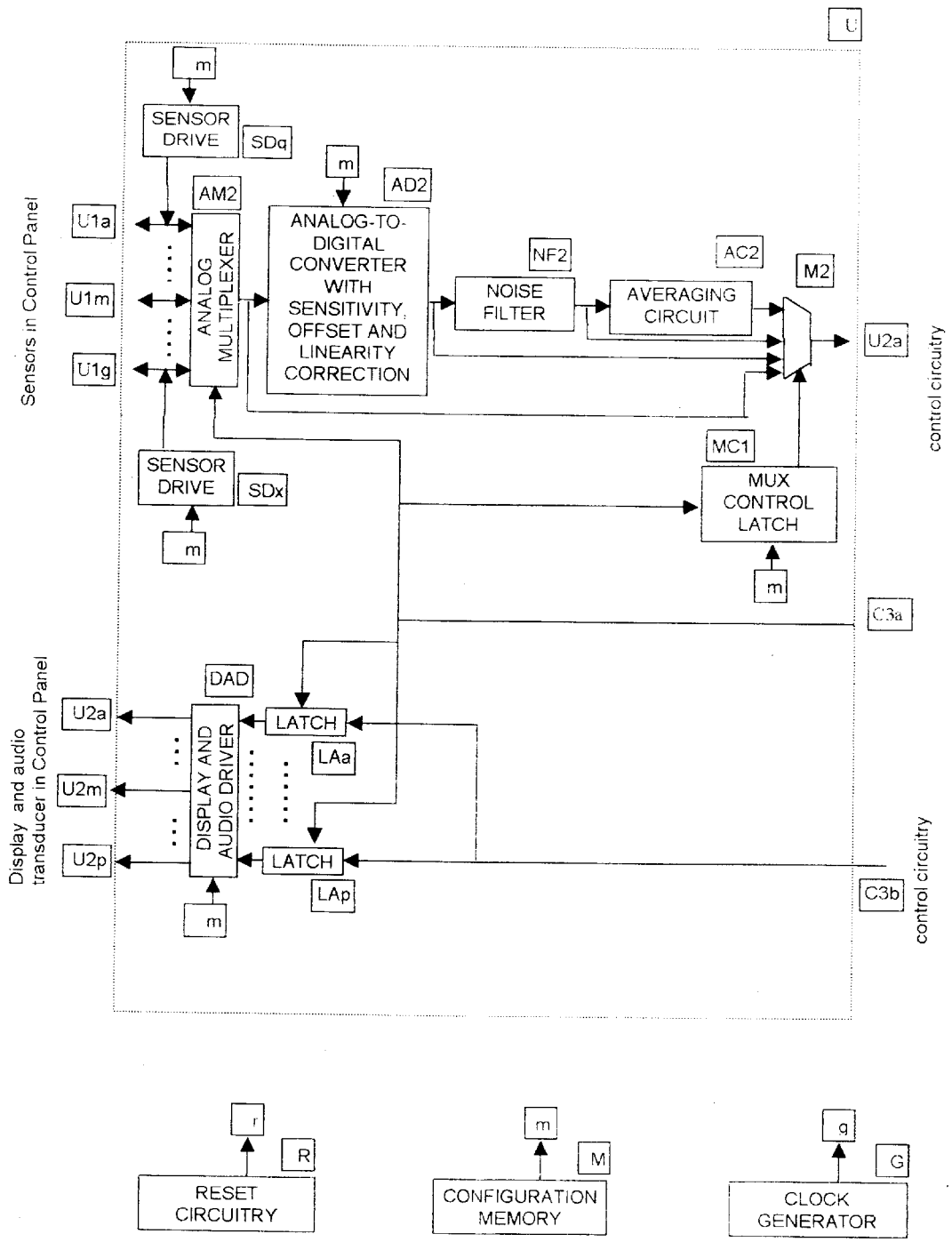
FIG. 11 shows one possible implementation of the configurable user interface circuitry.

FIG. 11 shows one implementation of the user interface circuitry. Configuration data (m) supplied by configuration memory (M) configures the functionality of:

a) sensor drive circuits (SDq to SDx).
b) analog-to-digital converter with sensitivity, offset and linearity correction (AD2).
c) noise filter (NF2)
d) averaging circuit (AC2)
e) multiplexer (M2).

As desired. External signal sources receive drive signals (U1a to U1p) from sensor drive circuits (SDq to SDx) and supply signals to the inputs of analog multiplexer (AM2). Selection signal (C3a) from the configurable control circuitry (C) controls multiplexer control (MC1) to apply one of the multiplexer control signals from configuration memory (m) to the control input of multiplexer (M2) to selectively connect one out of following signals to the output, as signal (U3a) to the configurable control circuitry (C):

a) output of the analog-to-digital converter with in-built sensitivity, offset and linearity correction,
b) output of the noise filter,
c) output of the averaging circuit,
d) output of the input analog multiplexer.

Similarly, the selection control signal (C3a) and data signal (C3b) from the configurable control circuitry (C) selectively provide the display and audio output for providing to the user through latches (LAa to Lap) and display and audio driver (DAD) generating signals (U2a to U2p). Reset signal (r) and clock signal (g) are supplied by reset circuit (R) and clock generator (G) for internal operations of the configurable user interface circuitry (U).

Figure 12:
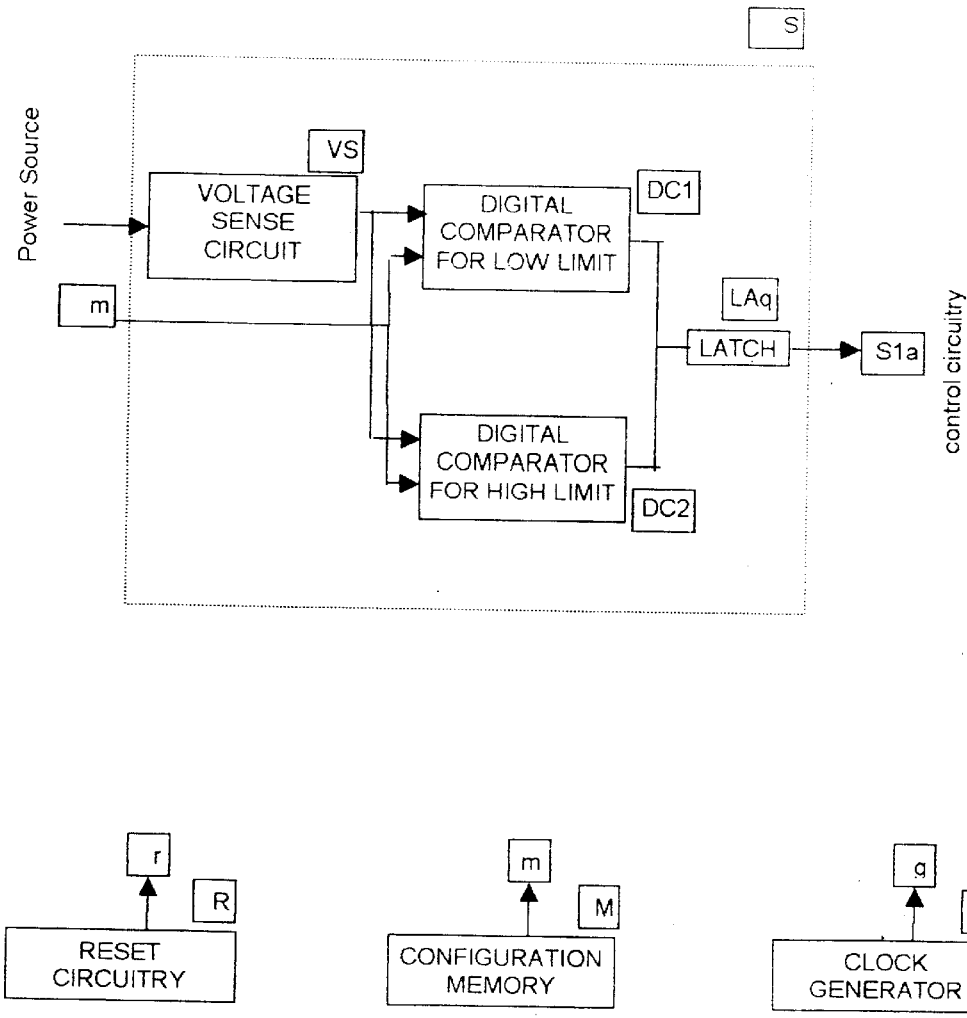
FIG. 12 shows one possible implementation of the supply interface circuitry.

FIG. 12 shows the internal structure of one implementation of the supply interface circuitry. Supply voltage sense circuit (VS) monitors the voltage of the input supply to the configurable electronic controller and provides a corresponding digital value at its output. The output of the supply voltage sense circuit (VS) is connected to one input of each of two digital comparators (DC1) and (DC2). The other input of each digital comparator receives reference data (m) supplied by configuration memory (M). The outputs of these digital comparators control a latch (LAq) which provides a signal (S1a) to control circuitry (C).). Reset signal (r) and clock signal (g) are supplied by reset circuit (R) and clock generator (G) for internal operations of the configurable power supply interface circuitry (U).

Figure 13:
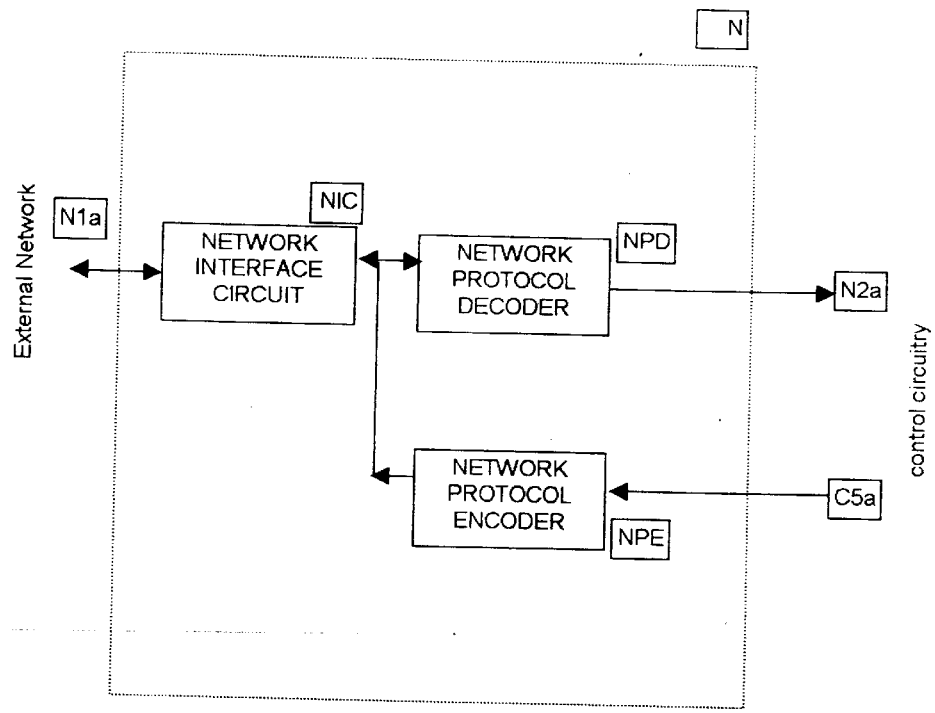
FIG. 13 shows one possible implementation of the network interface circuitry.

FIG. 13 shows the internal structure of one implementation of the network interface circuitry (N). Network interface circuitry (N) connects to the signal lines from the external network, provides compatible electrical signal levels and timings and a bi-directional transfer of signals between the network and the configurable electronic controller. The signals received from the network are received by a network protocol decoder circuit (NPD) which extracts the useful information from the received signal and presents as a signal (N2a) to the control circuitry (C). The signals received from the control circuitry (C) for transmission to the network are received by network protocol encoder (NPE) which adds-on protocol defined information and feeds it to the network interface circuit (NIC) for transmission to the external network. Reset signal (r) and clock signal (g) are supplied by reset circuit (R) and clock generator (G) for internal operations of the network interface circuitry (N).

Figure 14:
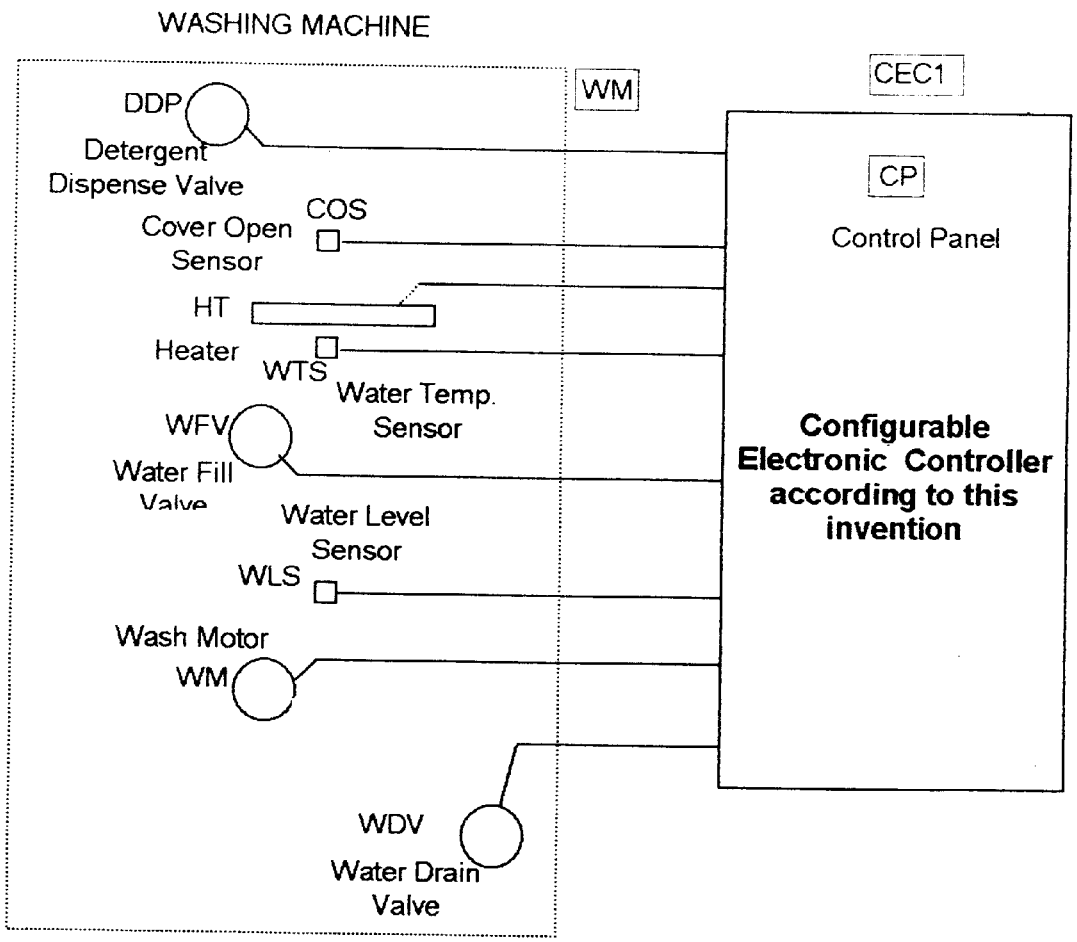
FIG. 14 shows an application of the configurable electronic controller in a washing machine.

FIG. 14 shows an application of the configurable electronic controller (CEC1) in a washing machine (WM). Configuration data from the configuration memory in the configurable electronic controller configures:

a) the configurable control circuitry inside the configurable electronic controller for performing the desired control functions of the washing machine,
b) the configurable output circuitry in the configurable electronic controller for providing interface signals for driving the wash motor (WM), the water fill valve solenoid (WFV), water drain valve solenoid (WDV), the detergent dispense valve solenoid (DDV), and the heater(HT), in the washing machine,
c) the configurable input circuitry for interfacing to the water level sensor (WLS), water temperature sensor (WTS) and the cover open switch (CS), in the washing machine,
d) the configurable user interface circuitry for interfacing to the user input devices and user output devices in the control panel (CP), in the washing machine,
e) the configurable power supply interface circuitry for monitoring the ac input power supply supplied to the washing machine.

The signals received from the water level sensor (WLS), water temperature sensor (WTS) and a cover-open switch (CS) and user selection data, such as kind of wash, are used by the configurable electronic controller (CEC1) to control the wash motor (WM), water fill valve (WFV), heater (HT), detergent dispense valve (DDV), and the water drain valve (WDV) to automatically operate the washing machine in the desired manner.

Figure 15:
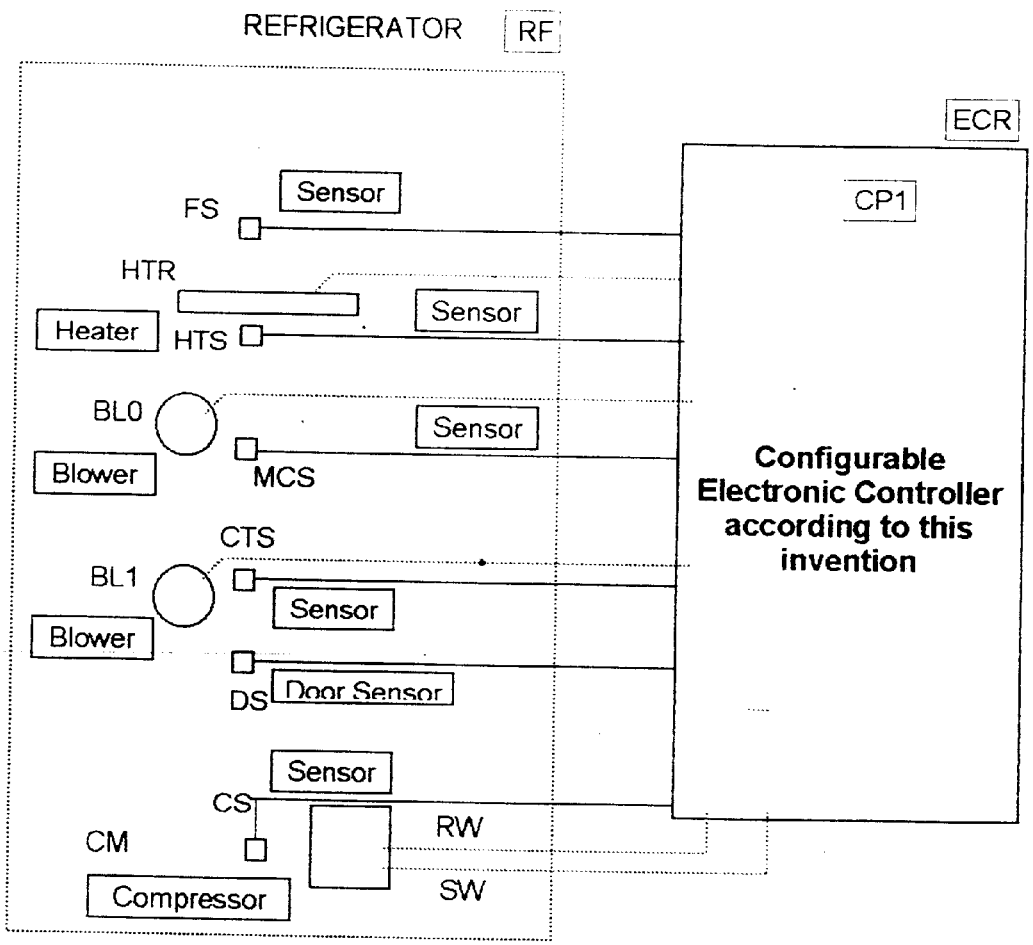
FIG. 15 shows the application of the configurable electronic controller in a refrigerator.

FIG. 15 shows the application of the configurable electronic controller (ECR) in a refrigerator (RF). Configuration data from the configuration memory in the configurable electronic controller configures:

a) the configurable control circuitry inside the configurable electronic controller for performing the desired control functions of the refrigerator,
b) the configurable output circuitry in the configurable electronic controller for providing interface signals for driving the refrigeration compressor (CM), blowers (BL0 and BL1), and the defrost heater (HTR), in the refrigerator, c) the configurable input circuitry for interfacing to the freezer temperature (FS), main compartment temperature sensor (MCS), crisper temperature sensor (CTS), defrost heater temperature sensor (DHS), compressor housing temperature sensor (CS), and the door open switch (DS), in the refrigerator, d) the configurable user interface circuitry for interfacing to the user input devices and user output devices in the control panel (CP1), in the refrigerator e) the configurable power supply interface circuitry for monitoring the ac input power supply supplied to the refrigerator.

Temperature sensors (FS) (MCS), (CTS), and (HTS) sense the temperature in the freezer, main compartment, crisper unit and defrost heater respectively, of the refrigerator and feed signals corresponding to the sensed values at the inputs of the configurable electronic controller (ECR). In addition, sensor (CS) functions as an over-heat sensor connected to the housing of the compressor (CM) and feeds a signal corresponding to the sensed temperature at another input of the configurable electronic controller (ECR). Switch (DS) provides door status information and key-switches in the control panel (CP1) provide user-selection data to other inputs of the configurable electronic controller (ECR). The compressor run winding (RW), compressor start winding (SW), blowers (BL0) and (BL1) and heater (HTR) are driven by the outputs of the configurable electronic controller (CEC2) which also provides a display in the control panel (CP1) of the configurable electronic controller (ECR) for providing feedback to the user.

Figure 16:
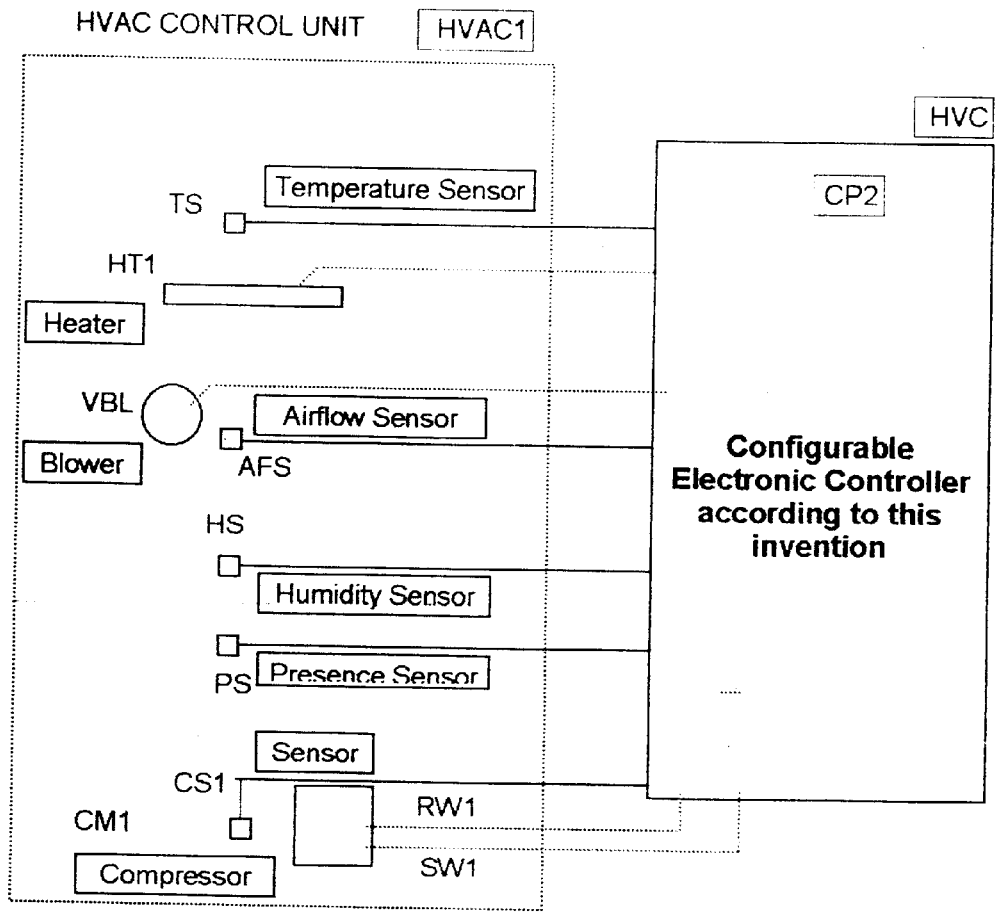
FIG. 16 shows the use of the configurable electronic controller for an HVAC application.

FIG. 16 shows an application of the configurable electronic controller (HVC) in an HVAC control unit (HVAC1). Configuration data from the configuration memory in the configurable electronic controller configures:

a) the configurable control circuitry inside the configurable electronic controller for performing the desired control functions of the HVAC control unit, b) the configurable output circuitry in the configurable electronic controller for providing interface signals for driving the ventilation blower (VBL), air-conditioning compressor (CM1), and air-conditioning heater (HT1).

c) the configurable input circuit for interfacing to the airflow sensor (AFS), temperature sensor(TS), humidity sensor (HS), presence sensor (PS), compressor housing temperature sensor (CS1).

d) the configurable user interface circuitry for interfacing to the user input devices and user output devices in the control panel (CP2), e) the configurable power supply interface circuitry for monitoring the ac input power supply supplied to the HVAC controller.

Temperature sensor (TS), senses the temperature in the room, while humidity sensor (HS) senses the humidity, airflow sensor (AFS) senses airflow, and presence sensor (PS) senses occupancy status in the room. Signals from each of the sensors are fed to the inputs of the configurable electronic controller (HVC). In addition, sensor (CS1) functions as an over-heat sensor connected to the housing of the compressor (CM1) and feeds a signal corresponding to the sensed temperature at another input of the configurable electronic controller (HVC). Key-switches in the control panel (CP2) provide user-selection data to other inputs of the configurable electronic controller (HVC). The compressor run winding (RW1), compressor start winding (SW1), blower (VBL) and heater (HT1) are driven by the outputs of the configurable electronic controller (HVC) which also provides a display in the control panel (CP2) of the configurable electronic controller (HVC) for providing feedback to the user.

What is claimed is:

1. An electronic controller comprising control circuitry for providing control functions, and output interface circuitry for providing output signals for controlling one or more load devices, characterised in that the said control circuitry and said output interface circuitry are designed to be modifiable in respect of hardware interconnections and functions so as to provide changeable behavior in response to configuration data stored in a configuration memory included in said electronic controller.

2. An electronic controller as claimed in claim 1, further comprising input interface circuitry connecting to one or more analog or digital input devices or switches for receiving input signals, the said input interface circuitry being designed to be configurable for various interfaces, by means of configuration data supplied by the said configuration memory.

3. An electronic controller as claimed in claim 1, further comprising user interface circuitry connecting to one or more analog and/or digital input devices and/or switches and/or audio input devices and/or biometric input devices including image sensors for receiving user inputs and one or more display and/or audio devices for providing feedback to the user, the said user interface circuitry being designed to be configurable for various interfaces, by means of configuration data supplied by the said configuration memory and optionally including means for performing speech recognition and/or biometric recognition.

4. An electronic controller as claimed in claim 2, further comprising user interface circuitry connecting to one or more analog or digital input devices or switches for receiving user inputs and one or more display or audio devices for providing feedback to the user, the said user interface circuitry being designed to be configurable for various interfaces, by means of configuration data supplied by the said configuration memory.

5. An electronic controller as claimed in claim 1, further comprising power supply interface circuitry, which connects to a power supply, monitors the power source conditions and provides control signals, the said power supply interface circuitry being designed to be configurable for various interfaces, by means of configuration data supplied by the said configuration memory.

6. An electronic controller as claimed in claim 2, further comprising power supply interface circuitry which connects to a power supply, monitors the power source conditions and provides control signals, the said power supply interface circuitry being designed to be configurable for various interfaces, by means of configuration data supplied by the said configuration memory.

7. An electronic controller as claimed in claim 3, further comprising power supply interface circuitry which connects to a power supply, monitors the power source conditions and provides control signals, the said power supply interface circuitry being designed to be configurable for interfaces, by means of configuration data supplied by the said configuration memory.

8. An electronic controller as claimed in claim 4, further comprising power supply interface circuitry which connects to a power supply, monitors the power source conditions and provides control signals, the said power supply interface circuitry is designed to be configurable, by means of configuration data supplied by the said configuration memory.

9. An electronic controller as claimed in claim 1, further comprising network interface circuitry that provides unidirectional or bi-directional data exchange with other devices such as computers and other electronic controllers, on the network.

10. An electronic controller as claimed in claim 2, further comprising network interface circuitry that provides unidirectional or bi-directional data exchange with other devices such as computers and other electronic controllers on the network.

11. An electronic controller as claimed in claim 3, further comprising network interface circuitry that provides unidirectional or bi-directional data exchange with other devices such as computers and other electronic controllers, on the network.

12. An electronic controller as claimed in claim 4 further comprising network interface circuitry that provides unidirectional or bi-directional data exchange with other devices such as computers and other electronic controllers, on the network.

13. An electronic controller as claimed in claim 5 further comprising network interface circuitry that provides unidirectional or bi-directional data exchange with other devices such as computers and other electronic controllers, on the network.

14. An electronic controller as claimed in claim 6, further comprising network interface circuitry that provides unidirectional or bi-directional data exchange with other devices such as computers and other electronic controllers, on the network.

15. An electronic controller as claimed in claim 7 further comprising network interface circuitry that provides unidirectional or bi-directional data exchange with other devices such as computers and other electronic controllers on the network.

16. An electronic controller as claimed in claim 8 further comprising network interface circuitry that provides unidirectional or bi-directional data exchange with other devices such as computers and other electronic controllers, on the network.

17. An electronic controller as claimed in claim 1 wherein the said configurable control circuitry and configurable output interface circuitry, are made configurable by providing in each of the circuitry:
- a plurality of predetermined Circuit elements containing a plurality of circuit element types each of which provides a specific function, the number and types of said circuit elements being chosen such that the functional requirements of each of the desired configurations are satisfied;
- a means for interconnecting the said circuit elements in required defined ways, each of which implements a desired set of functions by means of configuration data supplied by the said configuration memory.

18. An electronic controller as claimed in claim 2 wherein the said configurable input interface circuitry, is made configurable by providing:
- a plurality of predetermined circuit elements containing a plurality of circuit element types each of which provides a specific function, the number and types of said circuit elements being chosen such that the functional requirements of each of the desired configurations are met;
- a means for interconnecting the said circuit elements in required defined ways, each of which implements a desired set of functions by means of configuration data supplied by the said configuration memory.

19. An electronic controller as claimed in claim 3 wherein the said configurable user interface circuitry, is made configurable by providing:
- a plurality of predetermined circuit elements containing a plurality of circuit element types each of which provides a specific function, the number and types of said circuit elements being chosen such that the functional requirements of each of the desired configurations are met;
- a means for interconnecting the said circuit elements in required defined ways, each of which implements a desired set of functions by means of configuration data supplied by the said configuration memory.

20. An electronic controller as claimed in claim 5 wherein the said configurable power supply interface circuitry, is made configurable by providing:
- a plurality of predetermined circuit elements containing a plurality of circuit element types each of which provides a specific function, the number and types of said circuit elements being chosen such that the functional requirements of each of the desired configurations are met;
- a means for interconnecting the said circuit elements in required defined ways, each of which implements a desired set of functions by means of configuration data supplied by the said configuration memory.

21. An electronic controller as claimed in claim 1 wherein the said configurable control circuitry is a Gate Array with associated sequence control circuitry and counters and timers, that is configured for desired functionality by the configuration data supplied by the said configuration memory.

22. An electronic controller as claimed in claim 1 wherein the said configurable control circuitry is an embedded microcontroller with associated program memory, associated data memory; and associated counters and timers, the program memory containing a set of control programs from which the appropriate subset of programs is selected for desired functions, by the configuration data supplied by the said configuration memory.

23. An electronic controller as claimed in claim 1 wherein the said configurable control circuitry is an embedded digital signal processor (DSP) with associated program memory, associated data memory and associated counters and timers, the program memory containing a set of control programs the appropriate subset of programs being selected for desired functions, by the configuration data supplied by the said configuration memory.

24. An electronic controller as claimed in claim 1 wherein the said configurable control circuitry includes functions for providing simple ON-OFF control action.

25. An electronic controller as claimed in claim 1 wherein the said configurable control circuitry includes functions for providing Proportional., Integral, Derivative (PID) control action.

26. An electronic controller as claimed in claim 1 wherein the said configurable control circuitry includes a Real-Time-Clock (RTC) in order to provide the control functions based on real-time events.

27. An electronic controller as claimed in claim 1 wherein the said configurable output interface circuitry is configurable for each of the outputs to provide a level or a pulsed output signal for controlling the load, by means of configuration data supplied by the said configuration memory.

28. An electronic controller as claimed in claim 1 wherein the said configurable output interface circuitry is configurable for each of the outputs to provide a triac-drive signal or a relay/contactor drive signal or a transistor drive signal or a transistor drive signal for controlling the load, by means of configuration data supplied by the said configuration memory.

29. An electronic controller as claimed in claim 1 wherein the said configurable output interface circuitry is configurable for each of the outputs to provide a phase-angle control signal or integral cycle control signal or integral half-cycle control signal for controlling the load, by means of configuration data supplied by the said configuration memory.

30. An electronic controller as claimed in claim 1 wherein the said configurable input interface circuitry is configurable for each of the inputs to provide either a desired value of a constant current bias, or a balanced bridge interface, or an AC bias supply to the external signal source, by means of configuration data supplied by the said configuration memory.

31. An electronic controller as claimed in claim 2 wherein the said configurable input interface circuitry is configurable for each of the inputs to either perform analog-to-digital conversion for the case when the input signal is analog in nature, or process the signal without analog-to-digital conversion when the input signal is digital in nature, by means of configuration data supplied by the said configuration memory.

32. An electronic controller as claimed in claim 2 wherein the said configurable input interface circuitry is configurable for each of the inputs to perform debouncing for the case when the input signal is received from a mechanical switch, by means of configuration data supplied by the said configuration memory.

33. An electronic controller as claimed in claim 2 wherein the said configurable input interface circuitry is configurable for each of the inputs to include a filter in the processing of the received signal if so required, by means of configuration data supplied by the said configuration memory.

34. An electronic controller as claimed in claim 2 wherein the said configurable input interface circuitry is configurable for each of the inputs to include an averaging circuit in the processing of the input signal if so desired, by means of configuration data supplied by the said configuration memory.

35. An electronic controller as claimed in claim 3 wherein the said configurable user interface circuitry is configurable for each, input to provide a desired constant current bias if required by the external user input device, by means of configuration data supplied by the said configuration memory.

36. An electronic controller as claimed in claim 3 wherein the said configurable user interface circuitry is configurable for receiving user input though an infrared/ultrasonic/radio-frequency remote entry device, by means of configuration data supplied by the said configuration memory.

37. An electronic controller as claimed in claim 3 wherein the said configurable user interface circuitry is configurable for providing output signals for driving either an LED display, or a vacuum fluorescent display or an LCD display, by means of configuration data supplied by the said configuration memory.

38. An electronic controller as claimed in claim 3 wherein the said configurable user interface circuitry is configurable for providing output signals for driving either an multi-digit 7-segment display; or a bar-graph display, by means of configuration data supplied by the said configuration memory.

39. An electronic controller as claimed in claim 3 wherein the said configurable user interface circuitry includes the provision for generating tones and driving an audio transducer, by means of configuration data supplied by the said configuration memory.

40. An electronic controller as claimed in claim 3 wherein the said configurable user interface circuitry includes the provision for generating synthesized voice output signals and driving an audio transducer, by means of configuration data supplied by the said configuration memory.

41. An electronic controller as claimed in claim 5 wherein the said configurable power supply interface circuit,), is configurable for monitoring the input a.c. supply voltage and providing a signal if the said a.c. supply voltage is less than or greater than defined limits, by means of configuration data supplied by the said configuration memory.

42. An electronic controller as claimed in claim 5 wherein the said configurable power supply interface circuitry is configurable for monitoring the input d.c. supply voltage and providing a signal if the said d.c. supply voltage is less than or greater than defined limits, by means of configuration data supplied by the said configuration memory.

43. An electronic controller as claimed in claim 5 wherein the said configurable power supply interface circuitry is configurable for monitoring the input a.c. supply voltage and providing a signal on every zero-voltage crossing of the input a.c. supply, by means of configuration data supplied by the said configuration memory.

44. An electronic controller as claimed in claim 9 wherein the said network interface circuitry provides an interface to a TCP/IP network.

45. An electronic controller as claimed in claim 9 wherein the said network interface circuitry provides an interface to a CAN Bus network.

46. An electronic controller as claimed in claim 9 wherein the said network interface circuitry provides an interface to a BACNet network.

47. An electronic controller as claimed in claim 9 wherein the said network interface circuitry provides an interface to a BlueTooth wireless network.

48. An electronic controller as claimed in claim 1 wherein the said configuration memory is preferably a non-volatile memory.

49. An electronic controller as claimed in claim 1 wherein the said clock generator is an oscillator with a frequency preferably in the range 32 KHz to 25 MHz.

50. In a washing machine, an electronic controller comprising configurable control circuitry, output interface circuitry, input interface circuitry, user interface circuitry, power supply interface circuitry, network interface circuitry and configuration memory, wherein the configuration data from the said configuration memory:
   a) configures the configurable control circuitry which is based on an embedded microcontroller, to provide desired control functions using a selected set of stored control programs,
   b) configures the configurable output interface circuitry for providing triac-controlled drive for the wash motor, and water-fill, drain and detergent-dispense solenoids,
   c) configures the configurable input interface circuitry for providing bias drive for the water temperature sensor, and water level sensor and for enabling analog-to-digital conversion with suitable sensitivity, offset and linearity correction, noise filtering and signal averaging for the analog signals received from these sensors,
   d) configures the configurable user interface circuitry for interfacing to a keyboard on the control for receiving user selection input, and driving a digital LCD display and audio buzzer for providing feedback to the user, e) configures the configurable power supply interface for monitoring the input a.c. supply voltage and providing a signal when the voltage is outside defined limits.

51. In a household refrigerator, an electronic controller comprising configurable control circuitry, output interface circuitry, input interface circuitry, user interface circuitry, power supply interface circuitry, network interface circuitry and configuration memory wherein the configuration data from the said configuration memory:

a) configures the configurable control circuitry which is based on an gate array logic, to provide temperature control functions using a selected set of stored control programs, b) configures the configurable output interface circuitry for providing triac-controlled drive for the refrigeration compressor, defrost heater, and air-circulation blowers and dampers, c) configures the configurable input interface circuitry for providing bias drive for the temperature sensors, and for enabling analog-to-digital conversion with suitable sensitivity offset and linearity correction, noise filtering and signal averaging for the analog signals received from these sensors, d) configures the configurable user interface circuitry for interfacing to a keyboard on the control panel as well as an infra-red remote control device for receiving user selection input, and driving a digital LCD display and audio buzzer for providing feedback to the user, e) configures the configurable power supply interface tier monitoring the input a.c. supply voltage and providing a signal when the voltage is outside defined limits.

52. In an HVAC control system, an electronic controller comprising configurable control circuitry, output interface circuitry, input interface circuitry, user interface circuitry, power supply interface circuitry, network interface circuitry, and configuration memory, wherein the configuration data from the said configuration memory:

a) configures the configurable control circuitry which is based on an embedded microcontroller, to provide airflow control and temperature control functions using a selected set of stored control programs, b) configures the configurable output interface circuitry for providing brushless-DC motor drive for the airflow blower, triac-controlled drive for the air-conditioning compressor motor, and integral-cycle controlled drive for the air-conditioning heaters, c) configures the configurable input interface circuitry for providing bias drive for the temperature sensor, airflow sensor and humidity sensor, and for enabling analog-to-digital conversion with suitable sensitivity offset and linearity correction, noise filtering and signal averaging for the analog signals received from these sensors, d) configures the configurable user interface circuitry for interfacing to a keyboard on the control panel as well as an infra-red remote control device for receiving user selection input, and driving a digital LCD display and audio buzzer for providing feedback to the user, e) configures the configurable power supply interface for monitoring the input a.c. supply voltage and providing a signal when the voltage is outside defined limits.

* * * * *